United States Patent [19]

Brusasco

[11] Patent Number: 4,858,436
[45] Date of Patent: Aug. 22, 1989

[54] VEHICLE POWER BRAKE SYSTEM
[75] Inventor: Enzo Brusasco, Torino, Italy
[73] Assignee: Roltra S.p.A., Torino, Italy
[21] Appl. No.: 15,073
[22] Filed: Feb. 17, 1987
[30] Foreign Application Priority Data Feb. 21, 1986 [IT] Italy .............................. 53013/86[U]

[51] Int. Cl.[4] ............................................. F15B 7/00
[52] U.S. Cl. .................................. 60/545; 74/388 R; 318/481
[58] Field of Search ..... 60/545; 74/388 R, 424.8 VA; 318/14, 481; 91/391 R

[56] References Cited

U.S. PATENT DOCUMENTS

| | | | |
|---|---|---|---|
| 2,715,704 | 8/1955 | Carrick | 318/481 |
| 2,860,266 | 11/1958 | Schrader | 74/424.8 VA |
| 2,902,885 | 9/1959 | Wright | 74/424.8 VA |
| 4,224,832 | 9/1980 | Prohaska et al. | 60/545 |
| 4,324,100 | 4/1982 | House | 60/545 |
| 4,395,883 | 8/1983 | Melinat | 60/545 |
| 4,607,998 | 8/1986 | Hawkes | 60/545 |

*Primary Examiner*—A. Michael Chambers
*Attorney, Agent, or Firm*—Shlesinger & Myers

[57] ABSTRACT

A vehicle power brake system, whereby a control pedal may be mounted, in mobile manner, on to a fixed support, for axially displacing, when operated, a rod connected, at one end, to the control pedal, and, at the other end, to a control member on a brake hydraulic circuit; at least one portion of the rod consisting of a screw connected, via the interposition of balls, to a nut screw integral with a hollow shaft on an electric motor, through which hollow shaft the aforementioned rod extends; the electric motor being controlled by a threshold comparator, an input of which is connected to the electric output of a compression measuring device located between the control pedal and the rod.

6 Claims, 1 Drawing Sheet

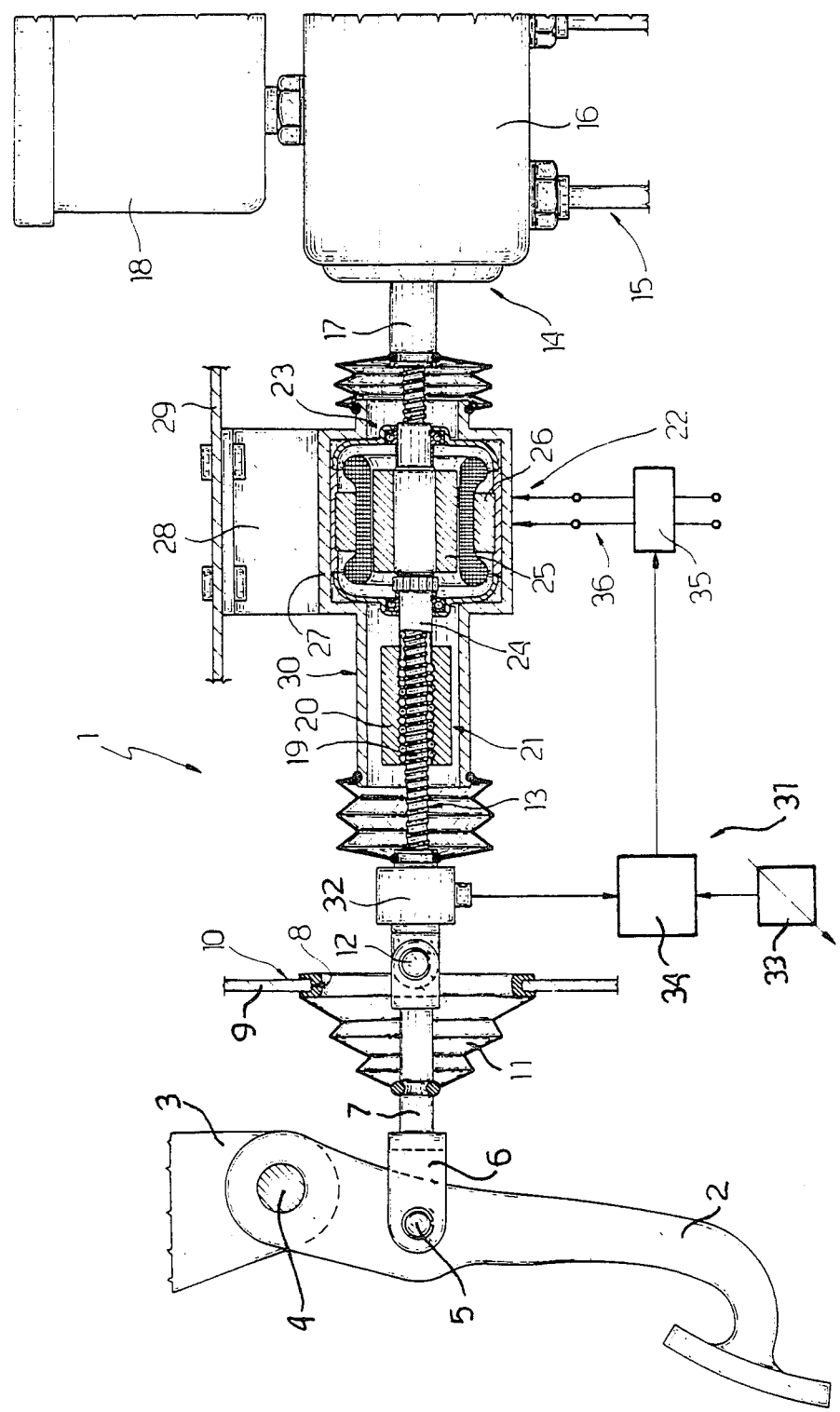

VEHICLE POWER BRAKE SYSTEM

BACKGROUND OF THE INVENTION

The present invention relates to a power brake system for vehicles, in particular, motor vehicles.

The power brake systems currently mounted on internal combustion engine vehicles, in particular, motor vehicles, have a hydraulic brake control cylinder interlocked with a pneumatic cylinder divided into two chambers by an internal membrane. The said two chambers normally communicate with each other, and are provided with complicated valve assemblies activated by the brake pedal and designed to cut off communication between the said two chambers, and to cause one to communicate externally and the other to communicate with an intake manifold on the engine.

Known power brake systems of the aforementioned type are usually highly complex and expensive to manufacture. Furthermore, in the event of breakage of the said membrane, operation of the brake pedal connects the engine lubricating oil circuit directly with the outside atmosphere, on one side, and with the intake manifold on the other.

SUMMARY OF THE INVENTION

The aim of the present invention is to provide a vehicle power brake system, particularly for motor vehicles, which is both cheap and straightforward to manufacture, and designed to overcome the aforementioned drawback.

With this aim in view, according to the present invention, there is provided a power brake system for vehicles, in particular motor vehicles, comprising a control pedal; a hydraulic circuit for fluid activating a braking member, the said hydraulic circuit comprising a hydraulic cylinder with a piston; a rod located between the said pedal and the said piston; and a power drive unit connected to the said rod; characterised by the fact that the said power drive unit comprises an electric motor with a hollow shaft; a screw-nut screw coupling on which the nut screw is integral with the said hollow shaft and the screw constitutes a portion of the said rod and extends through the said hollow shaft; and control means for activating the said electric motor in such a manner as to maintain the pressure exerted on the said control pedal below a given preset value.

BRIEF DESCRIPTION OF THE DRAWING

The present invention will be described, by way of a non-limiting example, with reference to the accompanying drawing, which shows an axial section of one embodiment of the same.

DETAILED DESCRIPTION OF THE INVENTION

Number 1 in the accompanying drawing indicates a brake system especially suitable for vehicles in general and, in particular, motor vehicles.

System 1 comprises a control pedal 2 connected at the top to a fixed support 3 in such a manner as to turn, in relation to the same, about a substantially horizontal connecting pin 4. At an intermediate point on pedal 2, there is hinged, via a pin 5 parallel with pin 4, an end fork 6 of a connecting rod 7. Connecting rod 7 extends through a hole 8 formed through a fixed wall 9 defining a compartment 10 usually consisting of the engine compartment on the said vehicle.

Connecting rod 7 is supported centrally in flexible manner by a tubular bellows 11, one end of which is engaged in sealed manner by connecting rod 7 itself, and the other end of which engages the edge of hole 8.

The end of connecting rod 7 located inside compartment 10 is hinged, via a pin 12 parallel with pin 4, to one end of a rod 13 controlling a unit 14, in turn, controlling a hydraulic circuit 15 for fluid activating a braking member (not shown) on the said vehicle. Control unit 14 comprises a hydraulic cylinder 16, having a piston 17 connected to rod 13, and a tank 18 for the said fluid. At least an intermediate portion of rod 13 consists of a rigid screw 19 connected, via the interposition of balls, to a nut screw 20.

Screw 19 and nut screw 20 constitute a recirculating-ball coupling 21 for connecting rod 13 to a power drive unit 22 comprising an electric motor 23 having a hollow shaft. Motor 23 presents a central, tubular output shaft 24 coaxial and integral with nut screw 20 and fitted through with screw 19, and comprises a rotor 25 coaxial and integral with shaft 24, and a stator 26 integral with a casing 27 connected integral with a fixed support 29, by means of bracket 28, and forming part of a tubular casing 30 protecting rod 13.

In addition to coupling 21 and motor 23, power drive unit 22 also comprises a control unit 31, in turn, comprising a known type of compression measuring device 32 available on the market; which device 32 is connected to rod 13 and designed to emit an electric signal proportional to the absolute value of the pressure exerted on pedal 2. Unit 22 also comprises an adjustable-output threshold regulator 33, and a threshold comparator 34 having a first input for receiving an adjustable threshold signal emitted by regulator 33, a second input for receiving the signal emitted by device 32, and an outut controlling opening and closing of a switch 35 provided on a circuit 36 supplying motor 23.

In actual use, the pressure exerted by the user on pedal 2, during braking, and transmitted by the said pedal 2 to rod 13, is measured continuously by device 32 the electric output signal of which, proportional to the said pressure, is received by threshold comparator 34 and compared continuously with a threshold or reference signal emitted by threshold regulator 33.

When the threshold signal exceeds the signal from device 32, no signal is emitted by comparator 34, and switch 35 remains in the normal open position. In this case, if the user exerts relatively low pressure on pedal 2, i.e. if the signal emitted by device 32 is lower than the threshold signal but other than zero, rod 13 is displaced axially directly by pedal 2, so as to turn nut screw 20 and rotor 25 via coupling 21.

When, on the other hand, the signal from device 32 exceeds the threshold signal, comparator 34 emits a signal, which closes switch 35 and activates motor 23. In this case, the action of the user on pedal 2 is accompanied by the action of motor 23, which, by turning nut screw 20, causes axial displacement of screw 19 towards hydraulic cylinder 16.

As soon as the user reduces the pressure on pedal 2 to below a given preset value, which may be adjusted in known manner by means of regulator 33, switch 35 is opened so as to shut down motor 23.

Coupling 21 is appropriately reversible, i.e. a coupling whereby rotation of nut screw 20 is accompanied by displacement of screw 19 and vice versa. Consequently, when pedal 2 is released by the user, the pressure inside cylinder 16 causes backward displacement of rod 13, which is accompanied by idle rotation of rotor 25, and pedal 2 returning to its normal raised position.

The advantages of power brake system 1 will be clear from the foregoing description. In addition to presenting an extremely straightforward structure, mainly due to the employment of motor 23 having a hollow shaft coaxial with rod 13, it is also extremely cheap to produce, by virtue of recirculating-ball coupling 21 acting as an epicyclic reduction gear, thus enabling employment of relatively cheap, low-power, high-speed electric motors.

I claim:

1. A power brake system for a vehicle, comprising:
   (a) a control pedal having a free first end and a second end pivotally connected with a portion of the vehicle;
   (b) hydraulic means for fluid activating a braking member;
   (c) said hydraulic means comprising a hydraulic cylinder with a piston member extending therefrom;
   (d) a rod having a first end operatively connected with said pedal and a second end operatively connected with said piston;
   (e) power drive means cooperating with said rod;
   (f) said power drive means comprising a motor and a hollow shaaft;
   (g) a reversible screw-nut screw coupling comprising a screw-nut integral with said hollow shaft and a screw shaft formed of a portion of said rod;
   (h) said screw shaft extending through said hollow shaft;
   (i) control means for selectively activating said motor in response to a pressure exerted on said control pedal.

2. The brake system of claim 1, wherein:
   (a) said screw-nut screw coupling is a recirculating-ball coupling.

3. The brake system of claim 1, wherein:
   (a) said control means comprising a pressure measuring device for supplying an output signal in proportion to a pressure exerted on said control pedal to a threshold comparator connected with said motor; and
   (b) said threshold comparator actuating said motor when said pressure exceeds a predetermined value.

4. The brake system of claim 3, comprising:
   (a) a switch cooperating with said threshold comparator and controlling an actuation circuit operatively connected with said motor; and
   (b) said threshold comparator closing said switch thereby actuating said motor when said pressure exceeds a predetermined value.

5. The brake system of claim 3, comprising:
   (a) an adjustable-output threshold regulator connected with said threshold comparator.

6. A power brake sysem for a vehicle, comprising:
   (a) a control pedal having a free end and a second end pivotally connected with a portion of the vehicle;
   (b) a connecting rod having a first end operatively connected with said pedal and a second end operatively connected with an end of a screw shaft;
   (c) another end of said screw shaft being connected to a hydraulic cylinder of the brake system;
   (d) power drive means cooperating with said screw shaft;
   (e) said power drive means being rod like in configuration throughout its length and including, in series, a reversible screw-nut screw coupling, and motor; and
   (f) said motor including a hollow output shaft substantially coaxial with said screw shaft and being integral with the screw-nut of said coupling.

* * * * *